Jan. 2, 1940.  R. E. PETERSON ET AL  2,185,751
MACHINE FOR STAPLING DIVERSIFIED WORK
Filed Oct. 17, 1938   7 Sheets-Sheet 1

INVENTORS
Roy E. Peterson,
Howard M. Larsen,
By R. W. Smith
ATTORNEY

Jan. 2, 1940.  R. E. PETERSON ET AL  2,185,751
MACHINE FOR STAPLING DIVERSIFIED WORK
Filed Oct. 17, 1938  7 Sheets-Sheet 2
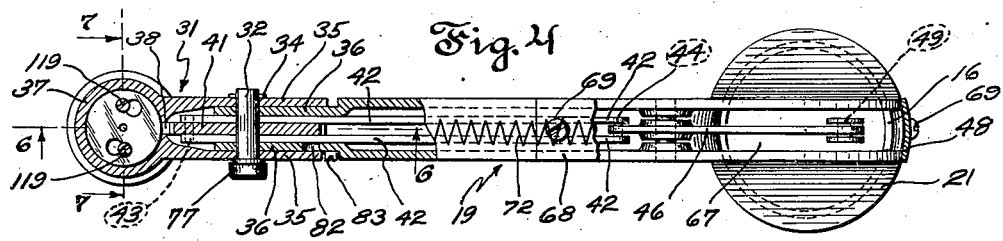
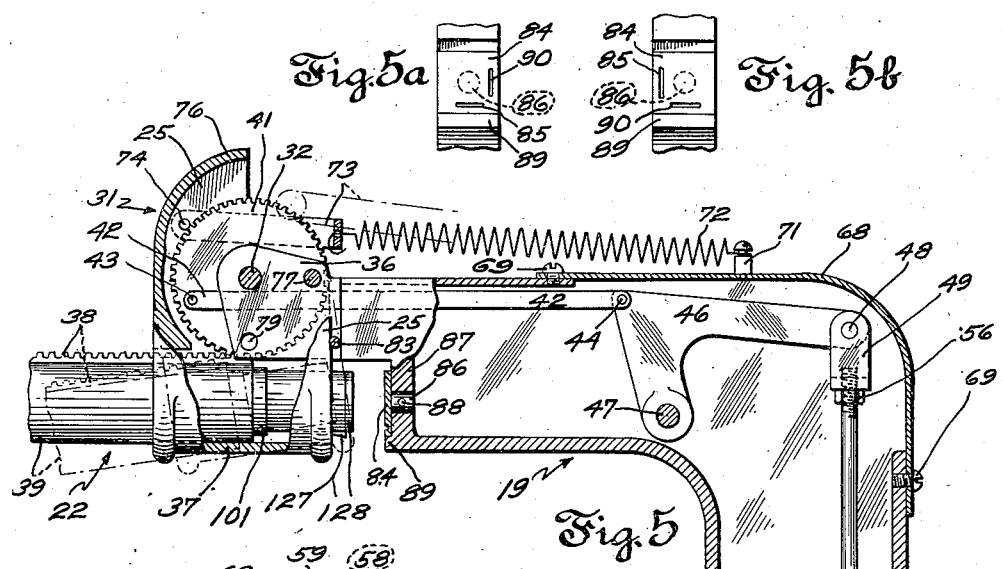
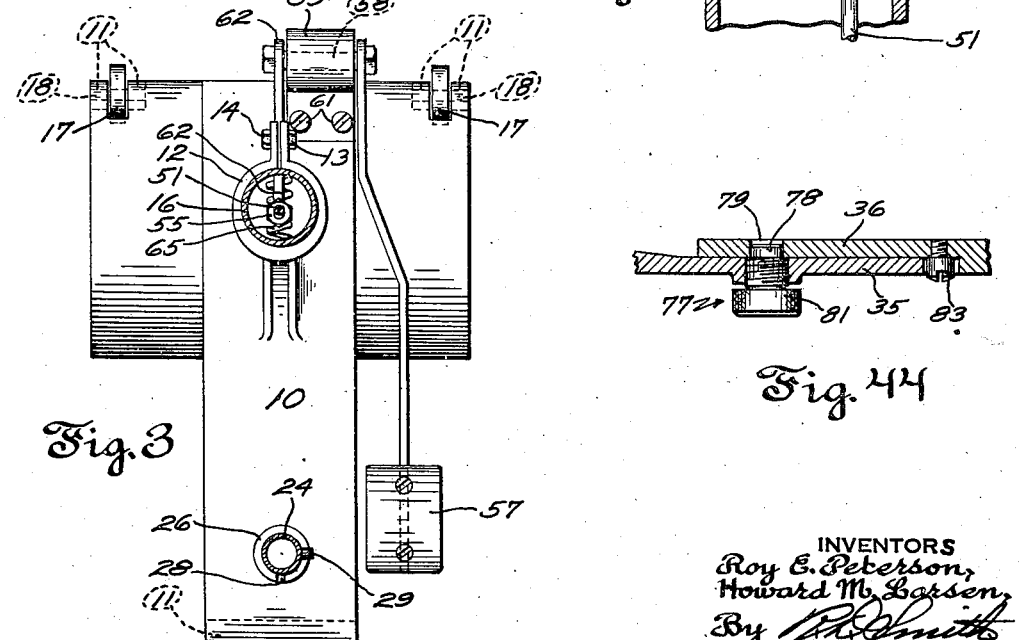
INVENTORS
Roy E. Peterson,
Howard M. Larsen,
By R. R. Smith
ATTORNEY Jan. 2, 1940.　　　R. E. PETERSON ET AL　　　2,185,751
MACHINE FOR STAPLING DIVERSIFIED WORK
Filed Oct. 17, 1938　　　7 Sheets-Sheet 3
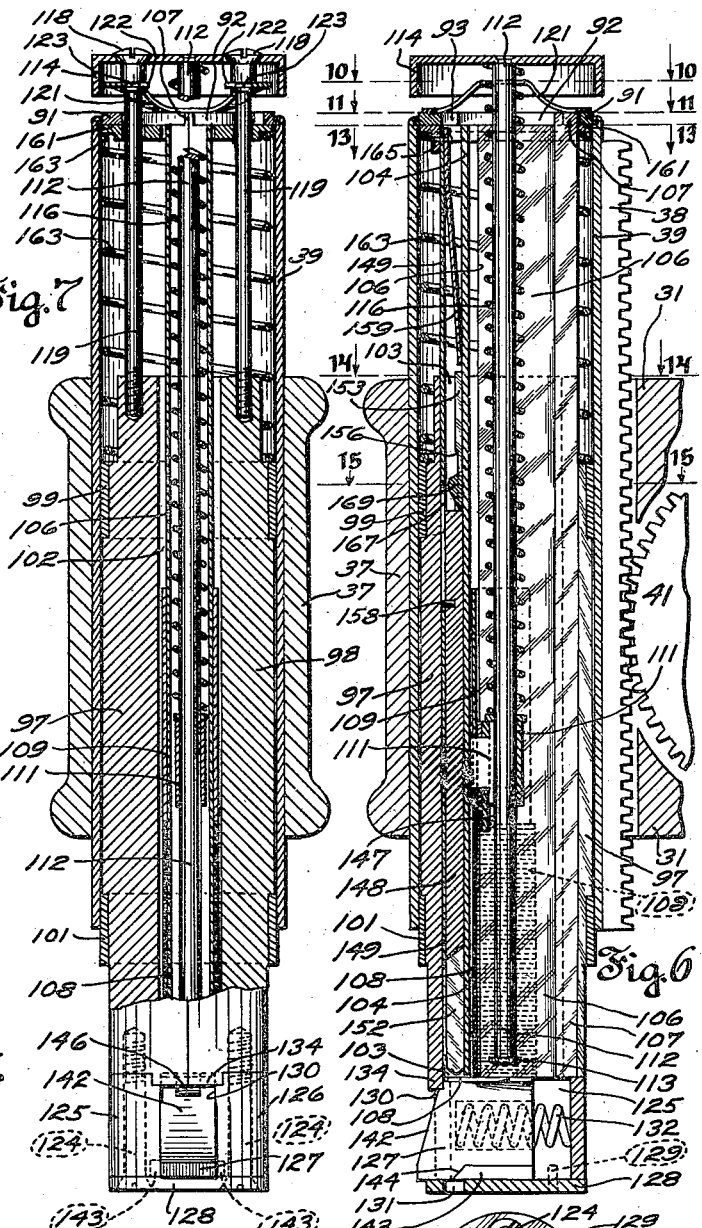

Jan. 2, 1940.   R. E. PETERSON ET AL   2,185,751
MACHINE FOR STAPLING DIVERSIFIED WORK
Filed Oct. 17, 1938   7 Sheets-Sheet 4
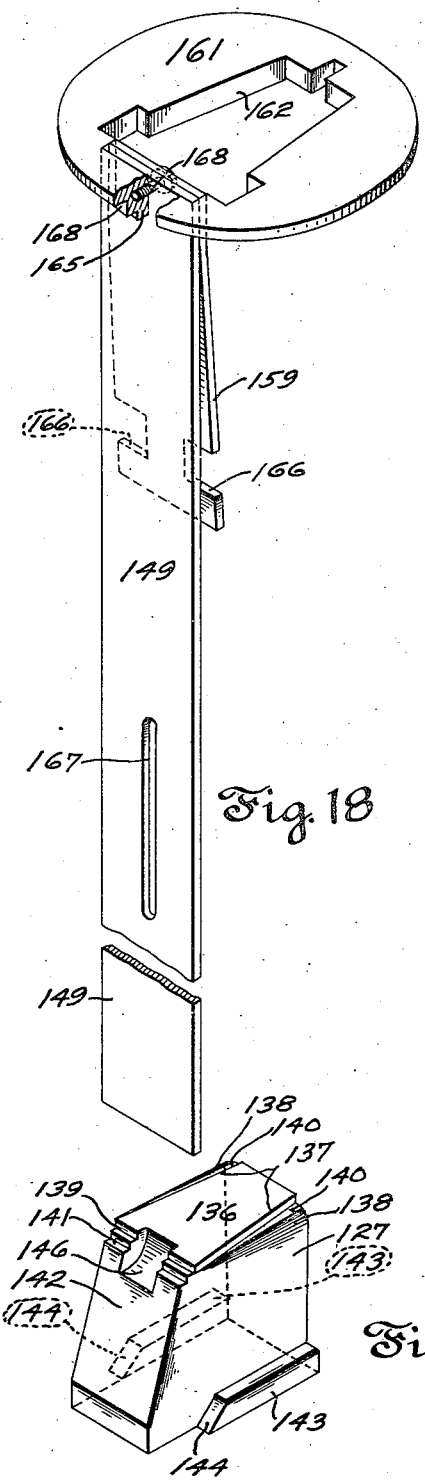
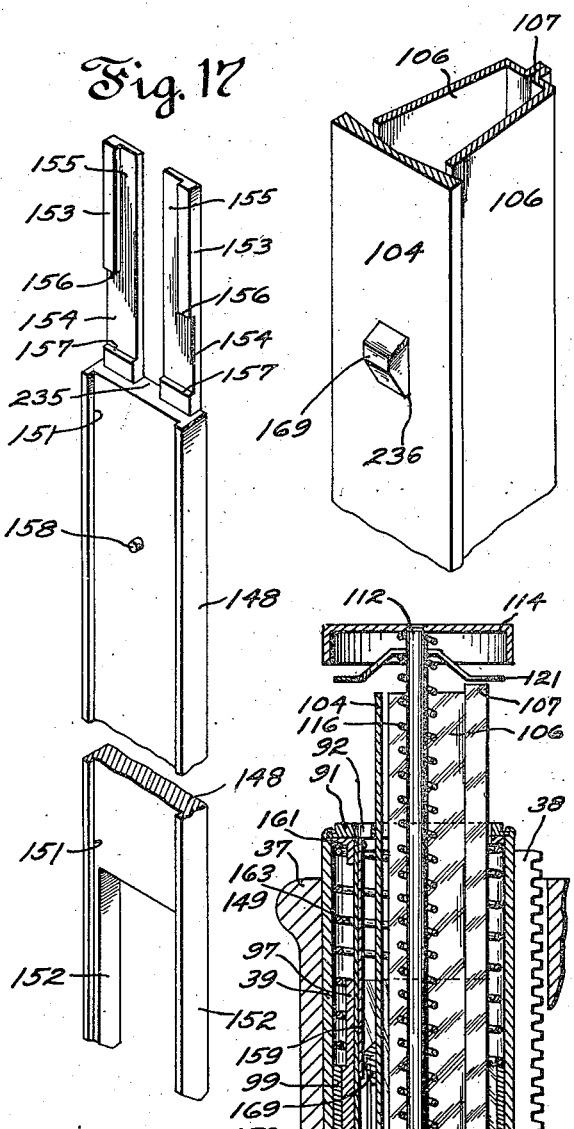
INVENTORS
Roy E. Peterson,
Howard M. Larsen,
By
ATTORNEY

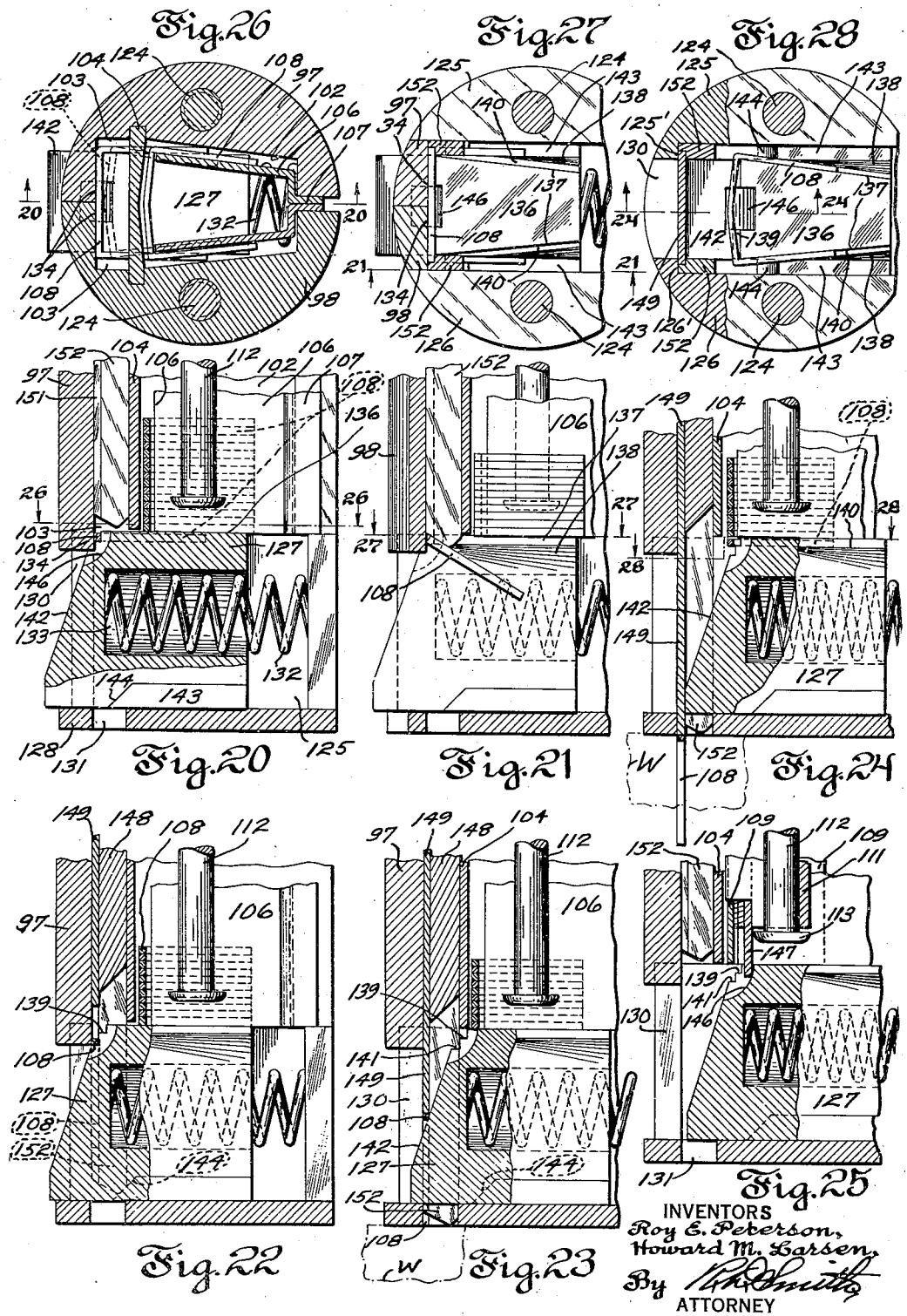

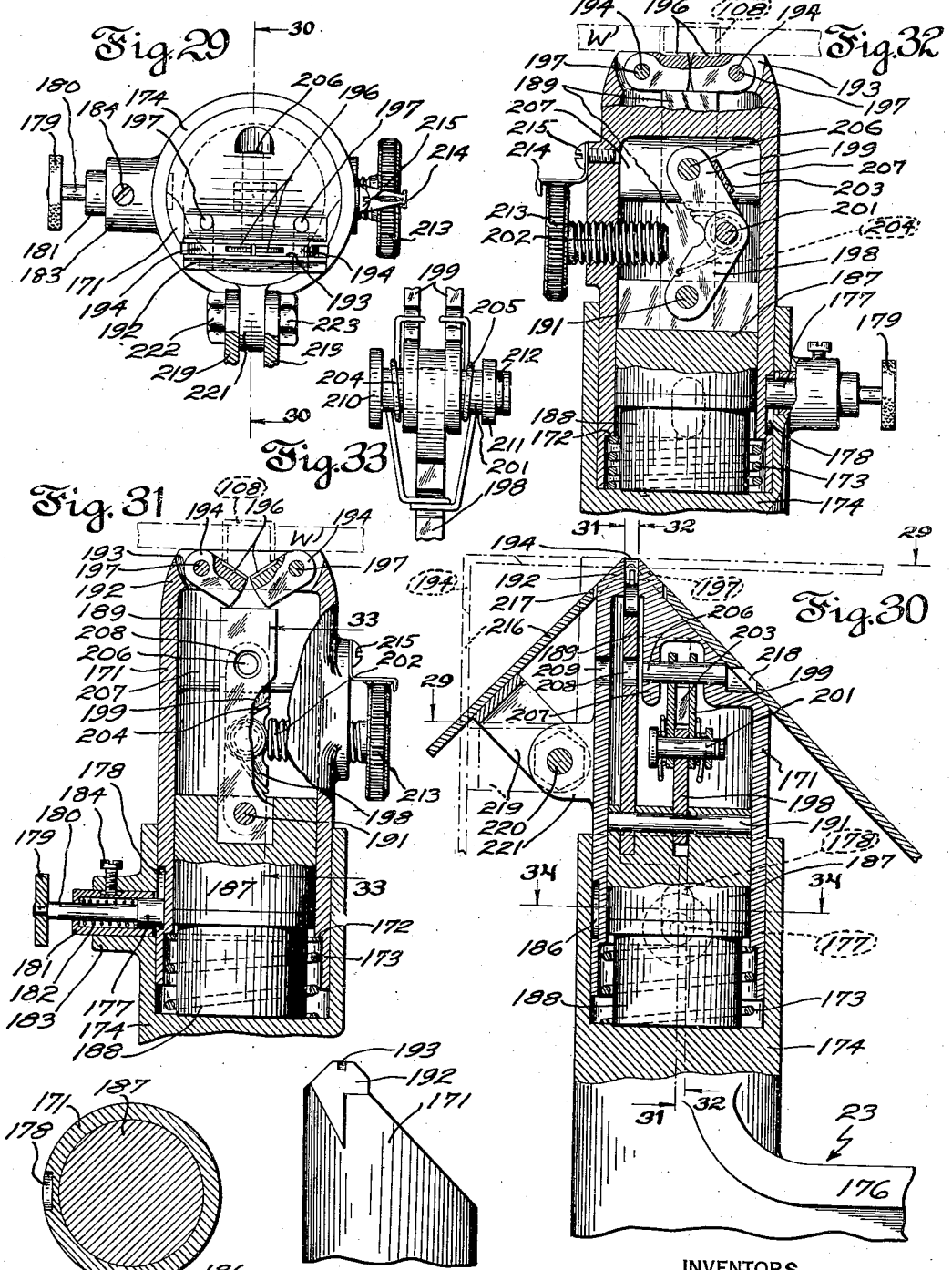

Jan. 2, 1940. R. E. PETERSON ET AL 2,185,751
MACHINE FOR STAPLING DIVERSIFIED WORK
Filed Oct. 17, 1938 7 Sheets-Sheet 7

INVENTORS
Roy E. Peterson,
Howard M. Larsen,
By R. R. Smith,
ATTORNEY

Patented Jan. 2, 1940

2,185,751

UNITED STATES PATENT OFFICE 2,185,751

MACHINE FOR STAPLING DIVERSIFIED WORK

Roy E. Peterson, Norwalk, and Howard M. Larsen, Westport, Conn., assignors to The E. H. Hotchkiss Company, Norwalk, Conn., a corporation of Connecticut Application October 17, 1938, Serial No. 235,436

40 Claims. (Cl. 1—3)

This invention relates to apparatus particularly suited for supporting and driving staples into work which may be of heavy and diversified nature as represented in the fastening together of a sheaf of book leaves, the top edges of bags packed with merchandise, the seams of cardboard containers or the edges of sheet material forming a tube, such apparatus commonly including means for clinching the legs of the staples against the work. Certain features of the invention are concerned with improved mechanism employed to feed and drive the staples regardless of the nature of the work into which the staples are to be driven and irrespective of whether the staple legs are to be clinched. Other features pertain to special staple-clinching or anvil mechanism, the parts of which are relatively movable for clinching staple legs against the work with greater than ordinary tightness.

An object of the improved apparatus as a whole is to provide a single stapling machine involving few and simple parts so constructed and arranged that it is capable of operating in more convenient and efficient manner upon as wide a variety of work as has heretofore required the use of a number of different stapling machines or a multiplicity of different attachments.

A contributory object of the invention is to afford in a single stapling machine the ability to operate with equal facility upon work requiring staples to be driven into it in a vertical direction and upon work requiring staples to be driven into it in a horizontal direction.

Another object is the ability of the apparatus to drive staples into work with the crown of the staple disposed in selective angular relations to the edge of the work, such as parallel therewith or perpendicular thereto.

A further object is to provide a single apparatus not only capable of driving its staples in either a vertical or a horizontal direction but also capable in either case of disposing the crowns of its staples so that they extend parallel with or perpendicular to the edges of the work.

A further object is to provide means for firmly clinching the legs of the staples at each of two spaced stapling stations which become cooperative on different occasions with a common staple-storing and staple-driving head.

A related object is to provide anvil structure at one or both of such stapling stations capable of clinching the legs of the staples when the staples are driven with their crowns extending in differing directions.

Another object is to provide an anvil for clinching staple legs, which anvil normally will afford a selectively predetermined strength of support to the thrust thereagainst of the work which is to be stapled, and thereafter act to cause a tight clinching pressure to be concentrated upon the legs of the staple at the anvil side of the work.

A further object is to provide a stapling head which may be operatively supported upon a C-type frame in such manner that the store of staples contained therein and automatically fed thereby may conveniently be replenished by the insertion of staples into the end of the stapling head from the top or from the front of the machine rather than from the rear of the machine, so that ample room may be assured for the removal of the usually long staple follower rod and for the reinsertion of same together with a long reload strip of staples, even when the machine stands with its back close to a wall.

A further object is to arrange the stapling head to be readily detachable as a unit from the rest of the apparatus, and likewise to arrange the anvil to be readily detachable as a unit.

A further object is to arrange the anvil to be shiftable to and usable in differently located stapling stations in the apparatus as well as turnable to different positions about the axis of the stapling head in one or all of said stapling stations.

A further object is to provide actuating connections for operating the stapling head with all of its beforementioned abilities of performance from a remote point by means of a foot pedal or some other source of manual or automatic power.

A related object is to construct and arrange such actuating connections in a manner to be concealed and protected within the main supporting framework of the apparatus, particularly where the latter is of the floor standard type.

In connection with the last mentioned form of apparatus an object of the invention is to provide optionally usable forms of anvil structure which may readily be interchanged so as to cooperate on different occasions with the same stapling head, each of said forms of anvil being especially suited to a different kind of work.

A particular object of the invention is to utilize a transversely reciprocative staple pick-off and transfer block having the general functions of that proposed in U. S. Patent No. 2,086,922, granted July 13, 1937, on an application of Roy E. Peterson, in connection with a staple driving blade which approaches the staple crown simultaneously with the approach of the staple turning bar, and to utilize such block not only for picking off and transferring the staples but also for straightening staples initially having bent crowns and converging legs. Staples of this general kind, and former means which have been employed for straightening them, are shown in U. S. Patent No. 1,987,038, granted January 8, 1935, to M. Vogel.

A still further object is to employ such transfer block in a manner to assist in preventing collapse or distortion of the straightened crown of the staple while the legs of the staple are being driven through exceptionally thick or tough materials such as characterize the heavy duty uses contemplated for the present apparatus.

The foregoing and other objects of these improvements will appear in greater detail from the following description of an illustrative embodiment of the invention in which reference is had to the accompanying drawings, wherein:

Fig. 3 is a plan view of the base and is taken in section on the plane 3—3 in Fig. 2.

Fig. 4 is a plan view of the overarm and stapling head with its operating mechanism drawn on an enlarged scale and is taken partly in section on the plane 4—4 in Fig. 1.

Fig. 5 is a fragmentary view of the overarm and parts carried thereby drawn on the same scale as Fig. 4 showing the side wall of the overarm and various other parts partially broken away better to expose their construction.

Fig. 5a is a fragmentary view looking from left to right at the face of the shiftable anvil plate in Fig. 5.

Fig. 5b is a view similar to Fig. 5a showing the same anvil plate shifted to a different position.

Fig. 6 is a further enlarged view taken for the most part in central vertical section through the stapling head and carrier on the plane 6—6 in Fig. 4.

Fig. 7 is a view taken on a corresponding scale and for the most part in central vertical section through the stapling head and carrier on the plane 7—7 in Fig. 4.

Fig. 8 is a bottom plan view looking upwardly at the work contacting lower end of the stapling head in Fig. 6.

Fig. 9 is a plan view looking downwardly on the top end of the stapling head in Fig. 6.

Fig. 10 is a view taken in cross section on the plane 10—10 in Fig. 6 looking downwardly.

Fig. 11 is a view taken in cross section on the plane 11—11 in Fig. 6 looking downwardly.

Fig. 12 is a view corresponding to Fig. 11 showing the interior body and operating parts of the stapling head shifted a quarter turn in relation to its cylindrical casing for disposing the crowns of the staple at right angles to the direction in which they formerly extended.

Fig. 13 is a view taken in cross section on the plane 13—13 in Fig. 6 looking downwardly.

Fig. 14 is a view taken in cross section on the plane 14—14 in Fig. 6 looking downwardly.

Fig. 15 is a view taken in cross section on the plane 15—15 in Fig. 6 looking downwardly.

Fig. 16 is a detached and still further enlarged perspective view of a portion of the length of the staple guide track structure including the fixed plate which separates the staple crowns from the raceway for the staple turning bar.

Fig. 17 is a contracted perspective view of the staple turning bar drawn on a corresponding scale.

Fig. 18 is a corresponding view of the staple-driving blade and parts which move in unison therewith drawn on a corresponding scale.

Fig. 19 is a detached perspective view of the staple turning block drawn on a corresponding scale.

Fig. 20 is an enlarged view of the staple ejecting end of the stapling head shown in Fig. 6, a portion of the staple turning block being shown in central vertical section on the plane 20—20 in Fig. 26.

Fig. 21 is a corresponding view taken in section on the plane 21—21 in Fig. 27 showing the staple legs in the process of being swung downwardly by the turning bar.

Fig. 22 is a corresponding view again showing the parts in central vertical section with the staple turning block retracted a distance rearwardly or toward the right by the further descent of the staple turning bar.

Fig. 23 is a corresponding view showing the staple turning block retracted still farther rearwardly or toward the right by the descent of the crown of the staple.

Fig. 24 is a corresponding view taken in section on the plane 24—24 in Fig. 28 showing the staple turning block fully retracted and the staple fully driven into the work.

Fig. 25 is a corresponding view showing the staple turning block held in retracted position to indicate exhaustion of the supply of staples.

Fig. 26 is a view taken in section on the plane 26—26 in Fig. 20 looking downwardly.

Fig. 27 is a view taken in section on the plane 27—27 in Fig. 21 looking downwardly.

Fig. 28 is a view taken in section on the planes 28—28 in Fig. 24.

Fig. 29 is an enlarged plan view of the work supporting and staple clinching anvil in Fig. 1 and is taken in section on the planes 29—29 in Fig. 30.

Fig. 30 is a view taken in central vertical section on the plane 30—30 in Fig. 29 showing a portion of the work supporting angle plate and a portion of the anvil support arm of the machine frame of Fig. 1.

Fig. 31 is a view taken partly in section on the plane 31—31 in Fig. 30 looking in the direction of the arrows.

Fig. 32 is a view taken partly in section on the plane 32—32 in Fig. 30 looking in the direction of the arrows, with the parts differently positioned.

Fig. 33 is a fragmentary view of the spring actuated toggle joint viewed from the plane 33—33 in Fig. 31 looking in the direction of the arrows and is drawn on a still further enlarged scale.

Fig. 34 is a view taken in cross section on the plane 34—34 in Fig. 30.

Fig. 35 is a view of the top portion of the anvil of Fig. 30 in side elevation.

Figs. 38 to 43 inclusive, are perspective views of the whole machine on a much reduced scale showing examples of diversified work which a machine embodying the present improvements is capable of handling.

Figure 1:
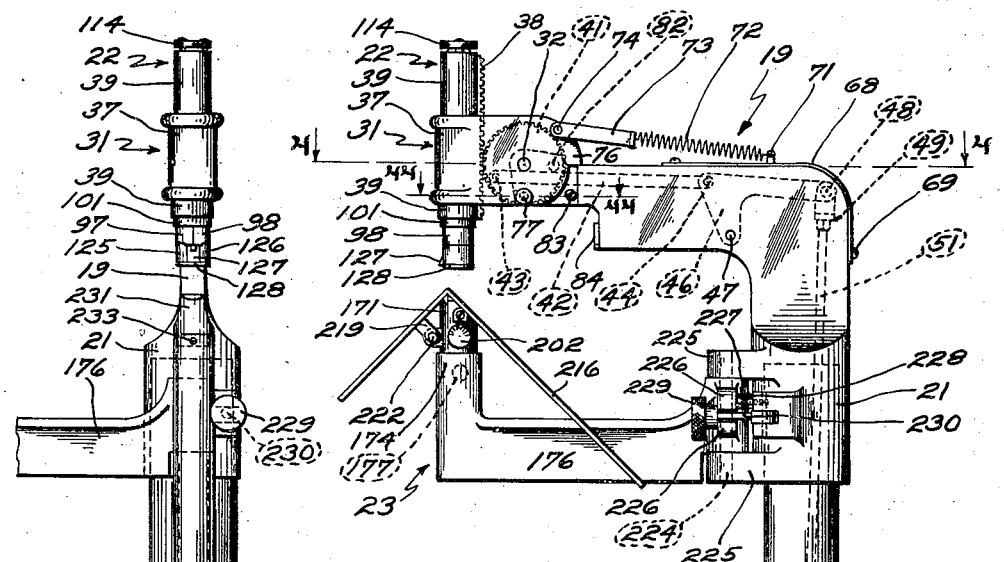
Fig. 1 is a side view of one form of a complete stapling machine embodying the present improvements, the vertical anvil support post being omitted and the horizontal anvil support arm being swung into position for use to support the work.

Fig. 44 is an enlarged fragmentary view of the carrier lock taken in section on the plane 44—44 in Fig. 1.

Fig. 45 shows the upper parts of Fig. 6 differently positioned.

While the working parts of this improved stapling machine may have sundry forms of support and be motivated by manual operation or by power means, there is illustrated herein a floor standard type of support which includes the hollow base 10 provided with foot pads 11 affording triangular or three point support. This enables the front of the base to be made narrower than the rear so that the operator may stand nearer to the vertical line of his work than would otherwise be possible without interference by the base of the machine. An upstanding split socket 12 may be integral with the base 10 and by means of the clamp bolt 13 and nut 14 may receive and rigidly support the lower end of a vertical hollow post 16 forming a standard. Two of the foot pads 11 are vertically slotted to accommodate the caster wheels 17. These wheels turn on pivot pins 18 mounted in such position on the base that the wheels are held slightly above the floor when the machine is upright but are adapted to provide a rolling support for the weight of the machine when the latter is tipped backwardly, or toward the right in Fig. 1, to a sufficient angle. The hollow of post 16 has free communication with the hollow of base 10 to accommodate parts of the actuating mechanism hereinafter described.

A forwardly extending overarm 19 terminates downwardly in an open ended socket casting 21 whose interior is shouldered enabling the overarm to be received upon and rigidly supported by the top end of the hollow post 16. The interior of the overarm 19 is hollow and provides a narrow space for actuating mechanism which communicates freely with the hollow of the socket casting 21 and thereby with the interior of the hollow post 16.

Figure 2:
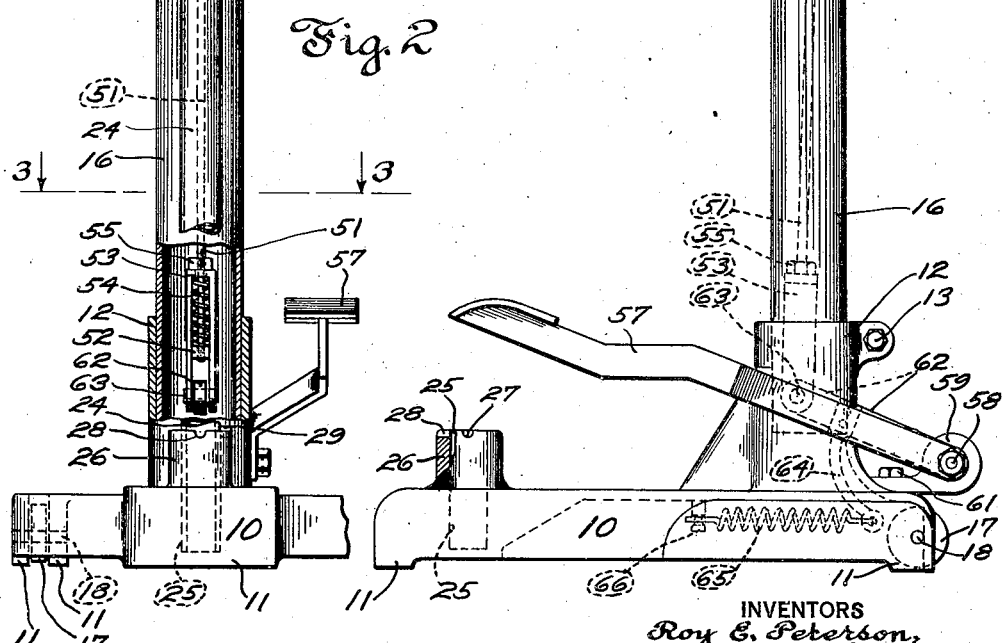
Fig. 2 is a front view of part of the machine looking from the left at Fig. 1 showing the anvil support arm swung aside and the vertical anvil support post installed in its place, a portion of said post and of the frame standard being broken away to expose parts of the interior operating mechanism.

The overarm 19 with its socket casting 21 supports the operative units of the stapling mechanism comprising a stapling head indicated as a whole by 22 and a staple clinching device indicated as a whole by 23. On occasions as will later be explained, the staple clinching device 23 may be swung aside and the anvil post 24, of Fig. 2, used in its place. Anvil post 24 is removably supported at its lower end by fitting snugly into a socket 25 in the base 10 whose length is partly made up by the cylindrical boss 26 which upstands near the forward end of the base and is provided with the locating notches 27, 28 in its top edge, either of which notches affords a seat for the locating pin 29 which projects laterally from the anvil post 24. This pin need not bear the downward pressure on the anvil post as the latter may seat upon the floor wall of socket 25 and be held upright with sufficient rigidity to cooperate accurately with the stapling head 22.

Stapling head 22 is supported at the forward end of overarm 19 by means which include the carrier 31 which is swingably mounted upon the overarm by means of the pivot pin 32 held in place by the cotter pin 34. Carrier 31 is for the most part hollow and its rearwardly extending side flanges 35 straddle the forwardly extending side flanges 36 of the overarm. The cylindrical body of stapling head 22 is slidably guided in a bearing-like formation 37 of the carrier 31, the hollow interior of which communicates with the space between side flanges 35 through a vertical slot of sufficient width to receive and guide the toothed rack strip 38 which is fixed rigidly on the outer surface of the barrel-like casing 39 of the stapling head 22.

The mechanism which causes stapling head 22 to move lengthwise in the bearing portion 37 of carrier 31 for performing its staple feeding and driving functions includes a spur gear 41 freely turnable on the pivot pin 32 between the overarm flanges 36 and constantly in mesh with the gear teeth on rack strip 38 except in a special position to which carrier 31 may be swung as indicated in broken lines in Fig. 5, for the purpose of disengagement of the rack strip from the spur gear to enable the removal of stapling head 22 from the carrier 31. Two parallel links 42 loosely flank and are pivotally attached to spur gear 41 at a common point 43 and extend rearwardly within the narrow hollow of overarm 19 to a point of pivotal connection 44 to the elbow of a bell crank 46 pivotally mounted at one of its ends on the cross pin 47 each of whose ends is fixed in a side wall of the overarm. The rear end of bell crank lever 46 is pivotally connected at 48 to a clevis 49 rigid with the long upright operating rod 51 extending through the hollow post 16 of the standard.

At its bottom end, rod 51 is rigid with a terminal block 52 between which and the top end of an elongated clevis 53 a coil spring 54 surrounding rod 51 is compressed lengthwise. Rod 51 has a free sliding fit through a hole in the top of clevis 53 and the degree to which the block 52 may be separated from the top of clevis 53 by the force of spring 54 is determined by nut 55 which has threaded engagement with rod 51. Nut 55 therefore may serve not only to vary the degree of tension normally exerted by spring 54 but also to vary the effective length of the connecting rod 51 as an operative part between the head of the machine and the base of the machine. Rod 51 is made rigid with the upper clevis 49 through threaded engagement therewith backed up by the lock nut 56.

Thus while nut 55 may not be employed to adjust the effective length of the connecting rod 51 without correspondingly altering the compression of spring 54, this effective length of the rod may, when desired, be altered without effect upon spring 54 by loosening lock nut 56 and screwing rod 51 further into or out of the cross wall of clevis 49 after which nut 56 may be set up firmly to lock the parts in their desired adjustment.

As means for operating rod 51 by foot power the treadle 57 is made rigid to one end of a shaft 58 having bearing in a bracket 59 rigidly secured by bolts 61 to the machine base 10. The opposite end of shaft 58 carries fixed thereon the forwardly extending arm 62 which enters the hollow interior of the base socket casting 21 through a vertical slot provided in the rear wall of same. Arm 62 is pivotally connected to the bifurcated bottom end of clevis 53 by the clevis pin 63. The rod actuating arm 62 rigidly carries within the hollow of socket casting 21 a downwardly extending spur member 64 whose bottom end occupies the hollow interior or base 10 and serves as anchorage for one end of the horizontally disposed spring 65 whose opposite end is anchored to a stud 66 depending from the top wall of the base, and rigid thereon. The pull of spring 65 toward the left upon the spur 64 of arm 62 thus tends to hold treadle 57 normally in its raised position shown in Figs. 1 and 2 and through the upward push of clevis 53 upon nut 55 tends to force the rod 51 into its uppermost position in which bell crank 46 is swung toward the left in Fig. 1 and the spur gear 41 is rotated to its extreme position in a clockwise direction about pivot pin 32. These normal positions of the parts keep the stapling head 22 elevated a proper distance above the staple clinching device 23 or anvil post 24 to accommodate the insertion of work to be stapled. A positive frame stop to determine this normal position of the parts may be introduced at any suitable point.

In the absence of any particular frame stop to limit the parts to their positions shown in Fig. 1 when urged thereto by spring 65, the purpose of such a stop may be served by pivot 32 intercepting the upward movement of links 42 as the ends of the latter which are pivoted to gear 41 are swung clockwise about pivot 32 in Fig. 1. For inspection and servicing, a portion of the top and rear edge of overarm 19 is cut away for practically the whole width of the overarm to provide a narrow opening 67 which may be covered by an edge plate 68 extending around the top rear corner of the overarm and held in place by screws 69.

The edge plate 68, or if preferred some suitable portion of overarm 19 itself, may be provided with a spring anchorage device such as the stud 71 to which one end of an extension spring 72 is secured, the other end of spring 72 engaging a spring terminal member 73 comprising a U-shaped strip loosely straddling the carrier 31 and swingably pivoted thereto at 74. Thus spring 72 constantly urges carrier 31 clockwise about the pivot pin 32 until the spur-like back end 76 of the carrier abuts against the top edge of the overarm as shown in Fig. 1 thereby to position stapling head 22 vertically. For positively locking carrier 31 in this position the screw plug 77 has threaded engagement with and penetrates the flange wall 35 of the carrier and has a plug terminal 78 projecting inwardly thereof to lockingly engage with a hole 79 in the flange wall 36 of the overarm 19 as shown in Fig. 44. An enlarged outwardly projecting knurled head 81 of the lock screw 77 enables this screw to be turned outwardly until its plug end 78 frees the hole 79. In this condition the carrier and the stapling head may be swung a quarter turn counter-clockwise to their positions shown in Fig. 5 against the tension in spring 72 and locked in this position by turning screw 77 inwardly until its plug end 78 engages with another hole 82 in flange wall 36.

An additional and removable screw 83 has threaded engagement with the flange wall 36 of the overarm so that its projecting head may normally engage with an edge of the overarm to limit counter clockwise swinging thereof about pivot 32 to the position shown in full lines in Fig. 5. On suitable occasions screw 83 may be removed so that carrier 31 may swing some additional distance counter clockwise to its broken line position in Fig. 5 thereby to run the teeth at the right end of the stapling head rack strip 38 sufficiently out of meshing engagement with the teeth of spur gear 41 so that the stapling head 22 as a whole may be removed bodily from its carrier 31.

When locked by screws 77 in its full line position in Fig. 5, the carrier holds the stapling head in a position to reciprocate horizontally in Fig. 5 and to be advanced toward the right in said figure by the same turning movement of gear 41 counter clockwise which causes the vertically positioned stapling head in Fig. 1 to move downwardly against the stapling clinching device 23 or anvil post 24. To serve as an anvil for clinching the legs of the staples driven into work by lengthwise movement of the stapling head 22 horizontally toward the right in Fig. 5 the grooved plate 84 is illustrated in Figs. 1, 5, 5a, and 5b having rigid therewith a rearwardly projecting shank 86 which may be coaxial with the cylindrical body of the stapling head and fitted into a hole in the wall section 87 of the overarm 19. Shank 86 may be anchored in wall section 87 by a cross pin 88 which when removed will permit the anvil plate 84 to be rotatively shifted from its position in Fig. 5a to its position in Fig. 5b. In each of these positions the lower edge of plate 84 may abut against a shoulder 89 formed on the wall section 87 as plate 84 is preferably square. Groove 85 or 90 serves to guide the staple leg in a correct direction of alignment when being clinched.

Details of the construction of the stapling head 22 and of the staple clinching device 23 will next be described. The outer casing 39 of the stapling head, which has been referred to hereinbefore, comprises a cylindrical sleeve or tube counterbored at its top end snugly to receive the flanged periphery of an apertured end disc 91 which is made fast to the tubular casing 39 by turning over the counterbored thin terminal end of the cylindrical wall of the latter so as to overlap and tightly hold the thin edge of disc 91 against the shoulder on the wall of casing 39 formed by the counterbore therein. The shape of the aperture 92 in disc 91 is such as to provide a shoulder 93, a shoulder 94, a notch 95 and a notch 96. The purposes served by this shape of the aperture 92 are pointed out in connection with the description of operation hereinafter with particular relation to Figs. 11 and 12 of the drawings.

Slidably and rotatably mounted within the stapling head casing 39 is a more or less solid and cylindrical body comprised of matched halves 97 and 98. These halves are secured together by hoops 99 and 101 preferably of hardened material forming circular steel bands whose outer peripheries engage the inner surface of the cylindrical casing 39 to take the wear of the telescopic sliding movement of body 97, 98 relative to casing 39. Thus all other parts within casing 39 may be of smaller compass than the inside diameter of the casing including the body halves 97, 98 in their length intermediate bearing hoops 99 and 101. The latter are a tight press fit around body sections 97 and 98 and enable these sections, if desired, to comprise die castings each containing matched grooves throughout its length combining to form the central magazine chamber 102 as well as the guideway 103 forwardly adjacent thereto and separated therefrom by a partition strip 104 whose lateral edges are seated securely within wing grooves in each of the body sections 97, 98. The partition strip 104 may have a forwardly presented flat surface and a rearwardly presented concave surface thereby respectively to serve as a rear guide wall bordering upon the guideway 103 and as a staple retaining wall bordering upon the magazine chamber 102. Fig. 6 makes plain that the partition strip 104 projects considerably above the top end of the magazine body 97, 98 and into the aperture 92 in the end disc 91 at the staple receiving or top end of the stapling head.

Substantially commensurate in length with partition strip 104 is the staple track 106, generally of U-shape in cross section, which may be comprised of an integral structure or of matched halves as shown in the drawings. A projecting flange 107 is rigid with track 106 throughout its length and is clamped immovably between the body sections 97 and 98 as a means of holding the track 106 so spaced from the inner side walls of magazine chamber 102 and from the partition strip 104 as freely to accommodate therebetween the strip of staples 108.

Also slidably accommodated in the space between the track 106 and body sections 97, 98 is a usual form of staple follower 109 which carries rigidly between the spaced walls of the track and centrally of the magazine chamber 102 the usual bearing sleeve 111 which surrounds and is slidable lengthwise of the long removable rod 112 having the button head 113 on the lower end thereof and fixedly riveted or otherwise secured to its handle cap 114 at its opposite or top end. In usual manner the long staple feeding spring 116 surrounds rod 112 and is under compression between the follower sleeve 111 and the handle cap 114. Cap 114 is provided with diametrically opposite key slot holes the larger ends of which will respectively pass the heads 118 of screws 119 therethrough and the smaller ends of which are chamfered to seat upwardly against said screw heads 118 as shown in Figs. 7 and 9.

The lower ends of screws 119 have threaded engagement respectively with the tops of body sections 97 and 98 being thereby held rigid therewith. As best shown in Figs. 6, 7, and 10, screws 119 constantly carry therewith a ring-like leaf type of spring 121 having forked projections extending radially inward and engaging a groove 123 cut in each of the head portions of screws 119. Intermediate portions of spring 121 are disposed in the position of parts in Figs. 6 and 7 to bear downwardly at diametrically opposite points upon the top surface of the end disc 91 of the stapling head casing 39. By the upward pull of spring 121 upon screws 119 combined with its downward thrust on end disc 91 the top end of the track flange 107 is kept interlocked with either notch 95 or notch 96 as shown respectively in Figs. 11 and 12 thereby to prevent accidental shifting of the body sections 97, 98 in rotative relation to the cylindrical casing 39. The tension in spring 121 can be manually overcome for purposely unlocking track flange 107 from either of said notches and shifting it into engagement with the other notch. The action of spring 163 is prevented from forcing the top end of track flange 107 downwardly out of engagement with either of notches 95 or 96 because of the stop engagement of turning bar crotch 235 with cam edge 236 as hereafter explained.

Rigidly attached to the bottom ends of the body sections 97, 98 by means of screws 124 are matched side walls 125 and 126 which form a housing for the staple turning slide block 127 and which for this purpose may be made of suitably hard metal to stand the wear of the reciprocative movements of this block. To form a floor for the block, and a bottom end surface for the stapling head as a whole suited to contacting the work to be stapled, the foot disc is clamped against the bottom edges of side walls 125, 126 by the same securing screws 124. Positive alignment of the foot disc 128 with side walls 125, 126 and of all these parts with the body sections 97, 98 may be assured by the use of dowel pins 129 engaging each of all mutually contacting members. The foot disc 128 contains the staple ejecting orifice 131 which by assembly of the parts as described may be brought into accurate lengthwise alignment with the guideway 103.

The vertical space between the foot disc 128 and the bottom end of the staple track 106 is just ample to permit the free transverse sliding action of turning block 127 therebetween and the partition strip 104 may terminate at its bottom end in approximately the same position. As shown in Figs. 6, 7 and 8, block 127 normally projects forwardly beyond the outer cylindrical walls of parts 97, 98, 125, 126 and 128 being urged partially through aperture 130 by a spring 132 for the most part contained within a horizontal bore 133 in the block opening at the rear thereof so that spring 132 remains under compression between block 127 and the adjoining walls at the rear of its housing members 125, 126. A limit to the forward thrust of block 127 by spring 132 is provided by the lug 134 which projects downwardly beyond the remainder of the bottom ends of body sections 97 and 98 in cylindrical alignment with side walls 125 and 126.

As within the scope of this invention any or all of the members 97, 98, 125, 126 and 128 may be constructed either as separate or integral parts, the drawings, and particularly Figs. 6, 7, and 20 to 25 inclusive, show most of these members as cross sectioned even though the view is that taken on a plane which would coincide with the abutting surfaces of these parts.

There remains to be described the mechanism which cooperates with the staple turning block 127 to actuate the latter, to straighten the crown of the staple, to turn the legs of the staple into alignment with the raceway and to drive the staple into the work through the ejecting orifice 131. These parts are most clearly shown in Figs. 6, and 16 to 28 inclusive. As shown in Fig. 19 the block which receives on its top portion one staple at a time from the strip of staples 108 has a flat top surface 136 with edges 137 which converge toward the rear of the block, conically rounded shoulders 138 connecting the same with the upright sides of the block, a staple pick-off and crown straightening upper notch 139 at its top front corner, a stop notch therebelow adapted to be engaged by the stop lug 134 of the body sections 97, 98, and an inclined front face 142 leading therefrom to near the bottom front corner of the block. In addition the block has a flange 143 rigid with each side thereof presenting at the forward end thereof the cam surface 144. The central portion of the top front corner of the block is cut back to form the recess 146 adapted, when the supply of staples is completely exhausted, to be entered by the bottom projecting end of a lock tongue 147 which is mounted rigidly between the staple follower 109 and its bearing sleeve 111 as shown in Fig. 25.

As shown in Figs. 26 and 28 staples may be used in this improved stapling head unit which have bent crowns so that the legs of the staple converge toward their free ends. The rounded shoulders 138 on the block 127 are so shaped as to leave a seat 140 for the extreme ends of the staple legs disposed in a horizontal plane adjacent the edges 137 while the portions of the crown which join the legs rest upon the notch 139. Thus the staple when first received upon block 127 is fully supported in a horizontal plane by suitable portions of the block itself relying upon no portion of the stationary body structure of the magazine to assist in such support.

The guideway 103, formed by the partition strip 104 and the walls of body sections 97, 98, is occupied by the staple turning bar 148, best shown in Fig. 17, and by the staple driving blade 149, best shown in Fig. 18. A channel 151 substantially equal in depth to the thickness of blade 149 extends the entire length of the turning bar 148 whose lower portion is bifurcated to form the staple turning prongs 152 and whose upper end is not only bifurcated but also reduced in thickness to form the actuated extensions 153 each of which is further reduced in thickness to provide a notch 154 bordered by the top shoulder 156 and bottom shoulder 157. A short stud 158 about equal in length to the depth of channel 151 projects from the forward surface of turning bar 148 in an upper portion thereof. Extensions 153 are thinned also at 155.

As best shown in Fig. 18 a leaf spring member or pusher 159 is secured at its top end, together with the top end of the staple driving blade 149, fixedly to a plunger plate 161 against the edge of an aperture 162 of irregular shape cut therethrough to accommodate the upwardly projecting portion of partition strip 104 and of staple track 106 in relation to which the plunger plate 161 is freely movable in a vertical direction.

In Fig. 18 a portion of the continuous rim of plunger plate 161 is broken away to show the nature of its cross section, this cross sectional shape providing an annular rabbet-like channel 163 adapted to seat the upper end of the coil spring 163. A further downward projection 165 carried by plunger plate 161 is adapted to engage the top end of the body sections 97, 98 to act as a stop when plunger plate 161 is forced fully downward in the absence of a work surface to oppose the ejection of a staple by the driving blade 149. The side edges of leaf spring 159 are notched near the lower end thereof to provide the upwardly disposed edges or shoulders 166 adapted to engage respectively with top shoulders 156 on the turning bar 148 for lifting the latter in the guideway 103. Blade 149 is provided with the elongated slot 167 adapted to be engaged by the stud 158 on the turning bar. A screw 168 is shown as representative of several suitable means which may be employed to attach the upper ends of blade 149 and pusher 159 securely to the plunger plate 161.

As best shown in Figs. 6 and 16, the partition strip 104 fixedly carries the forwardly projecting trip cam 169 which serves to thrust the bottom end portion of leaf spring 159 forwardly on suitable occasions during longitudinal movement of the leaf spring 159 in both upward and downward directions thereby to cause its disengagement with portions of the turning bar 148. In the downward movement of these parts, the extreme bottom end of the pusher 159 is adapted to align with and thrust downwardly upon the extreme top ends of the bar extensions 153 during a portion of the total longitudinal movement. The prongs 152 on bar 148 near the lower limit of movement of the latter are adapted to engage with the cam surfaces 144 respectively at each side of the staple turning or staple transfer block 127. For this purpose the prongs 152 straddle and closely flank the sides of block 127 allowing the latter sufficient freedom to slide transversely of the magazine structure while the turning bar slides longitudinally thereof.

With particular attention to Figs. 29 to 37 of the drawings, the staple clinching device hereinbefore referred to as 23 is seen to include an anvil unit including the housing shell 171 which has an open bottom end and is counterbored thereat to provide the seating shoulder 172 for a coil spring 173 which assists in the support of shell 171 by being confined under compression between shell 171 and the floor wall of the cup-like structure 174 carried at the forward extremity of the swingable support bracket 176. The upward movement of shell 171 responsive to spring 173 is positively limited by engagement of plunger 177 with the bottom end of a vertically elongated recess 178 in the cylindrical wall of the shell so that normally shell 171 is maintained in its elevated position shown in Fig. 31. The play between plunger 177 and the top end of recess 178 permits the shell on suitable occasions to be depressed to its position shown in Fig. 32.

As it is desired that the housing shell 171 may be shifted a quarter turn about its vertical axis, plunger 177 is constructed to be withdrawable from the recess 178 by means of the button 179 carried at the outer extremity of the plunger shank 180. Both this shank and the plunger are given bearing in a spring retaining barrel 181 which houses the spring 182 under compression normally urging plunger 177 toward the right in Fig. 31. The spring barrel 181 is removably secured within a boss 183 on the cup structure 174 by means of a set screw 184 which engages a flat thereon. Fig. 34 shows that the housing shell contains another recess 186 like recess 178 displaced from the latter 90-degrees about the periphery of the housing shell so that on suitable occasion plunger 177 may be withdrawn from recess 178 and the housing shell then turned so that recess 186 may be engaged by the plunger.

Stationed within the bottom portion of the housing shell 171 in a manner freely to permit vertical sliding movement of shell 171 relative thereto, is the cylindrical block 187 which rests solidly upon a pedestal block 188 which in turn rests solidly upon the floor wall of the cup structure 174. Block 187 carries the post 189 rigid therewith and upstanding therefrom its bottom end being firmly seated in a closely fitting slot in the top of the block and maintained immovably therein by the cross pin 191 which extends diametrically through the block. Shell 171 terminates in an upwardly directed slotted mouth 192 in whose narrow aperture 193 are swingably mounted the two anvil dies 194 provided on their top edges with the aligned grooves 196 for guiding and clinching the staple legs. Pins 197 extending crosswise the aperture 193 serve as pivots respectively for the dies 194 and position the latter so that the free ends thereof normally drop downwardly by gravity and rest upon the top end of post 189.

For resisting with selectively adjustable effect the downward movement of housing shell 171 responsive to the thrust of work thereagainst, a toggle linkage is novelly employed comprised of the lower link 198 and the upper link 199 pivotally connected thereto by the pin 201 to form a floating elbow joint which in the position of parts shown in Fig. 31 abuts against the inner end of an adjustable limit screw 202. The upper link 199 may be formed by similar flank-like side wall portions of a bent sheet metal piece connected by the bridge 203 so that the space between the two side walls of link 199 may be occupied by the upper end of link 198. Pivot pin 201 possesses enough excess length at each side of the links to serve as anchorage for two coiled pieces of spring wire 204 and 205. One free end of each wire bears in a notch in the edge of link 199 and the other free end of each wire bears in a notch in the edge of link 198.

The resilient tendency of springs 204 and 205 thereby acts to straighten the toggle joint and to align the links thereof in their approximately vertical position shown in Fig. 31 because the bottom end of link 198 is pivoted for free swinging movement upon the cross pin 191 in block 187 while the top end of link 199 is correspondingly pivoted for swinging movement about the wrist pin 206 one end of which is held in the outer wall of shell 171 and the other end of which is held in a downwardly extending partition wall 207 rigid with the housing shell adjacent the post 189. A hole 208 in post 189 and a hole 209 in another wall of the housing shell 171 serve to admit a tool for hammering against the left end of wrist pin 206 in Fig. 30 for removing it to disassemble the parts. The pivot pin 201 of the floating joint retains the toggle spring 204 by means of its enlarged head 210 while the other toggle spring 205 is retained on pin 201 by a washer 211 and the cotter pin 212.

To indicate a given setting of the toggle conditioning adjuster screw 202, the outer flat face of its head 213 may be provided with suitable graduation marks and a spring metal piece 214, secured to the outer surface of housing shell 171 by screw 215, may serve as a pointer or index in cooperative relation to the said graduations, screw 202 having threaded engagement with the wall of the housing shell, and its head 213 being knurled for clicking detent engagement by piece 214.

In order that the toggle links 198 and 199 may buckle at the proper time against the resistance of springs 204 and 205 when the housing shell 171 becomes subjected to some predetermined magnitude of downward force of the work thereagainst, adjuster screw preferably occupies some setting in a range of positions which prevents the floating elbow joint from ever moving far enough toward the right in Fig. 31 to enable the center of the joint pin 201 to reach a position coincident with a straight line passing through the center of pins 191 and 206. In other words the floating joint must not actually reach or pass a "dead center" relationship in the toggle linkage. The degree of approach to this relationship determines the degree of force which must be exerted downwardly on housing shell 171 to cause the toggle linkage to buckle into its position shown in Fig. 32. Spring 173 serves to assist in restoring housing shell 171 to its elevated position although toggle springs 204 and 205 could do this unaided if made strong enough.

Figure 39:
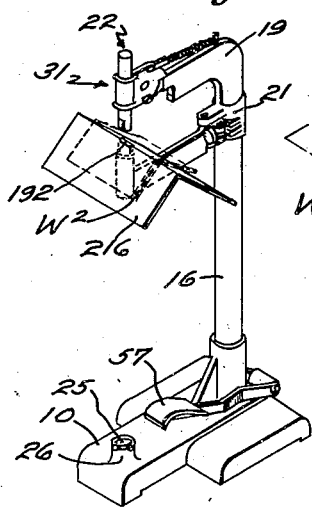

For supporting particular kinds of work to better advantage than would be possible by permitting the work to rest on the top of the housing shell 171 alone, the angle plate rest 216 is provided having an aperture 217 directly at its corner bend and a similar aperture 218 slightly removed therefrom in the flat reach of the rest plate. A forked bracket 219 is rigid with this rest plate and its two free ends straddle the boss 221 which is rigid with housing shell 171. The removable bolt 222 and nut 223 clamp the bracket 219 against boss 221 and thus hold the rest plate 216 in either its full line position as shown in Figs. 30 and 39 or in its broken line position in Fig. 30 which corresponds with its position shown in Fig. 40. In the first of said positions the corner aperture 217 is penetrated by the top projecting mouth 192 of the shell 171 while in the last mentioned of said positions the aperture 218 is so occupied by said mouth.

The swingable support bracket 176 hereinbefore referred to is hinged at its rear end upon the vertical pivot pin 224 between the forwardly projecting lugs 225 which are rigid on the socket casting 21. Bracket 176 carries two vertically spaced lugs at the side of its hinged and one of which abuts against the head of a stop stud 227 having threaded engagement with the socket casting 21 and held in adjusted position by the lock nut 228. Lug 226 is releasably maintained in abutting contact with the head of stop stud 227 by the thumb nut 229 which has threaded engagement with the draw bolt 230 whose opposite end is pivotally anchored on the socket casting 21 in a manner to swing in and out of engagement with the spaced lugs 226 on bracket 176. When the draw bolt 230 occupies the space between these lugs, turning up of the thumb nut 229 forces lug 226 firmly against stop stud 227 and holds bracket 176 locked in place to position shell 171 accurately beneath stapling head 22.

Figure 36:
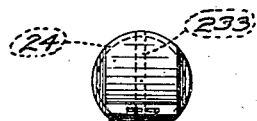
Fig. 36 is an enlarged plan view of the top end of the post supported anvil in Fig. 2.
Figure 37:
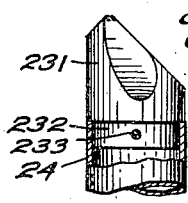
Fig. 37 is a view showing a side elevation of the post supported anvil of Fig. 36.

Figs. 36 and 37 show that the anvil post 24 hereinbefore referred to may be hollow and have pinned to it at its top end the anvil head 231 whose short shank portion 232 is reduced in diameter snugly to fit into the top end of post 24. The pin 233 is indicated and may be a through pin firmly holding head 231 in place. The forward inclined and rearward inclined top faces of the anvil head 231 may have the same respective inclines as do the corresponding top surfaces of the housing shell 171 of the yielding anvil device of Figs. 29, 30 and 35. Grooves 234 serve to guide the legs of a staple while the staple is being clinched.

The operation of the complete machine when set up as in Fig. 38 for driving a staple into work consisting, say, of the cardboard flaps of a shallow box cover which overlap to constitute a box bottom, is as follows.

Figure 38:
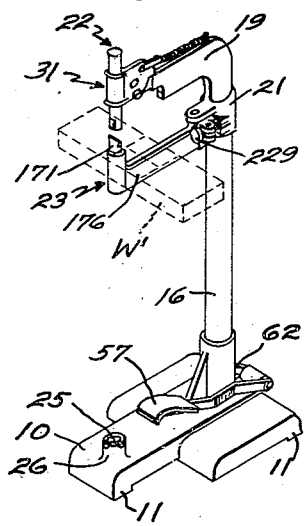
Figure 42:
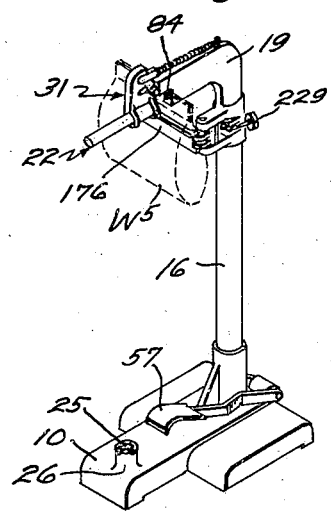

Through the ability of carrier 31 to swing on pivot 32 from its position in Fig. 38 toward its position in Fig. 42 against the yielding resistance of spring 72 when the carrier locking plug 77 is retracted from hole 79, a shallow box cover W' may be thrust rearwardly over and past the top of anvil housing shell 171 without particular attention as to whether or not the depth of the box cover is greater than the space between the stapling head 22 and the staple-clinching or anvil device 23. Whenever necessary the yielding movement of the carrier will permit the lower end of the stapling head to be swung to inclined position by the thrust of the work thereagainst thus opening up this space after which the stapling head will be caused automatically to assume its proper working position by the tension in spring 72 and the abutment of the spur-like back end 76 of the carrier against the top edge of overarm 19.

The box cover or other work is now placed in proper position and permitted to rest upon the top of the anvil housing shell 171 of the staple clinching device 23. This housing shell will at first bear the weight of the work without yielding downwardly because of the resistance of the toggle mechanism of Fig. 33, assisted by the spring 173 when the latter is employed. For some classes of work spring 173 may be omitted. Treadle 57 is then depressed by the operator's foot against the resistance of spring 65. This causes arm 62 to pull downwardly on clevis 53 which through the medium of spring 54 pulls downwardly on rod 51. Thereby clevis 49 causes the bell-crank lever 46 to swing clockwise in Figs. 1 and 5 and pull the links 42 toward the right. Gear 41 is thereby rotated in counter clockwise direction in Figs. 1 and 5 and forces the stapling head 22 downwardly until the foot disc 128 at the bottom end of the stapling head contacts the work.

Continued depression of treadle 57, after the downward movement of the inner section of the stapling head (which includes the magazine structure with its main body halves 97 and 98) has been arrested by contact with the work, causes continued downward movement of the stapling head casing 39 and its top apertured cross wall 90. At the beginning of this relative telescopic movement of the outer section or casing of the stapling head relative to the inner or magazine section thereof, the staple feeding, transfer, turning and driving parts are positioned as in Figs. 6, 7, 20 and 26. Now, as in Fig. 45, casing top wall 90 begins to force downwardly the apertured plunger plate 161 and with it both the staple driving blade 149 and the leaf spring pusher 159 and against the resistance of the plate lifting spring 163. Staple turning bar 148 is thus initially caused to move downwardly in unison with the staple driving blade 149 because at this time the bottom extremity of pusher 159, owing to the spring tension in this part which urges such extremity constantly toward the right in Figs. 6 and 18, is aligned with and located directly above the top ends of the upper extensions 153 of the turning bar as shown in Fig. 6. Also at this time the stud 158 projecting from the turning bar occupies the lower portion of the slot 167 in the staple driving blade 149.

Prongs 152 of the turning bar are thus the first to descend into contact with the staple legs. These prongs are bluntly pointed on their staple engaging ends to act first upon the legs of the staples at a distance from the staple crown which crown is at this time imprisoned between the crown straightening notch 139 in the staple transfer block 127 and the stop lug 134 of the body sections 97, 98 of the magazine structure. The first effect of this action is to swing the staple legs downwardly as shown in Fig. 21, the crown of the staple meanwhile swiveling within the notch 139. Fig. 22 shows the staple legs swung farther clockwise until they point vertically downward. In this figure also, the bottom ends of prongs 152 have so far descended as to engage respectively the two cam surfaces 144 at each side of the block 127 and thereby thrust this block slightly toward the right in Fig. 22 against the opposition of spring 132, the front edges of prongs 152 being slidingly supported throughout their length by the shoulders 125' and 126' on the side wall members 125 and 126, respectively, of the block housing best shown in Fig. 28. These shoulders in conjunction with the channel 151 in the front face of turning bar 148 form a raceway for the staple in the positions of the turning bar in Figs. 22, 23 and 24. This raceway leads to and is continued by the front and end edges of foot disc 128 which border upon the staple ejecting orifice 131. Since, also, all space between the staple legs is completely filled by the transfer block 127, each staple leg is guidingly encompassed on all four sides within its said raceway throughout all portions of its length which have not already passed out of the orifice 131 and into the work. Fig. 22 further shows the bottom end of the staple driving blade 149 as not yet having arrived in contact with the crown of the staple. The staple crown however, is shown as having dropped into the lower notch 134 by gravity or by the frictional urge of the turning bar surfaces which are moving downwardly past it, the retraction of block 127 toward the right having withdrawn notch 139 from its initial position underlying the staple crown.

In Fig. 23, blade 149 is seen to be driving downwardly upon the crown of the staple while the extreme bottom ends of turning bar prongs 152 have passed through orifice 131 and have come into contact with the surface of the work W to be stapled and thereby arrested against further movement downward. Means within the magazine structure to prevent prongs 152 from passing out of orifice 131 in the absence of any work surface abutting foot disc 128, thereby to keep these prongs from being needlessly exposed and damaged, consists in stud 158 and slot 167, also in shoulders 156 and 166 and may in other suitable ways be provided.

Fig. 23 further shows that blade 149 has continued to travel downwardly and drive the staple before it after turning bar 148 has been arrested. This is permitted because the extreme bottom edge of the leaf spring pusher 159 has encountered the upper inclined face of stationary trip cam 169 and has thereby been thrust forwardly by virtue of its own downward travel and out of impelling relation to the top of turning bar extension 153. Fig. 23 also shows that during this downward travel of the staple in its raceway the otherwise unseated crown of the staple rides in sliding contact with the inclined front face 142 of the transfer block 127 thus acting to force this block still farther rearwardly or toward the right in Fig. 23 and against the continued opposition of spring 132. The resistive pressure of the block face 142 against the staple crown serves to keep the crown from crumpling or distorting under the downward pressure of the driving blade when the legs of the staple encounter the resistance of the work into which they are driven, as they are about to do in Fig. 23 where the bottom ends of the staple legs are just flush with the outer surface of the foot disc 128.

In Fig. 24 it is seen that the blade has driven the staple fully out of the orifice 131 and into the work W. This leaves the transfer block 127 held fully retracted to the rear or toward the right in Fig. 24, by the obstruction of blade 149. The block is thus temporarily positioned to receive into its top corner notch 139 the bent or bowed crown of the bottom staple of the strip of staples 108 which is constantly urged downwardly by the follower 109 and its spring 116. The staples are thus fed, one at a time, onto the top of block 127 at each excursion of same rearwardly to its position in Fig. 28. As shown in Fig. 28 the staple legs initially converge toward their points. If at this time no staple remains on the lower end of track 106 to be fed onto the top of block 127 then the follower carried tongue 147 will enter the recess 146 in the block and permanently hold the block retracted in its position in Fig. 25 until the follower device is removed from the magazine chamber to replenish the supply of staples. The absence of block 127 from its normal position projecting forwardly through and slightly out of the aperture 130 serves as a signal that the supply of staples is exhausted.

While the staple is thus being driven into the work no downward yielding of the underlying housing shell 171 of the staple clinching device 23 has taken place despite the pressure exerted downwardly thereagainst through the medium of the work because the maximum pressure which could so far be exerted upon the supporting anvil shell 171 is that portion of the total force exerted by gear 41 upon rack 38 which spring 163 is capable of transmitting to the inner magazine section of the stapling head, together with the very slight force which the points of the staple legs are able to exert downwardly as they pass into and through the work. Now, however, the staple driving blade becomes arrested in its movement through its guideway 103 and through the staple raceway because its bottom end brings up against the crown of a staple which has reached the work surface. And if the material of which the work is composed is soft, the blade, instead of forcing the staple crown without limit thereinto, will be ultimately arrested in its downward travel through its guideway when the downward projection 165 on plunger plate 161 abuts against the top of magazine body sections 97, 98 at a time when the staple contacting end of the driving blade 149 is but slightly outside the orifice 131. Hence thereafter, all of the impelling force capable of being imparted by gear 41 to the rack 38 is positively transmitted to the inner magazine section of the stapling head and, through the medium of its foot disc 128 and the underlying work, downwardly upon the housing shell 171 of the anvil or staple clinching device. Upon this occasion the housing shell 171 will yield downwardly to the superior force now exerted upon it, such force being sufficient to dislodge the toggle links 198 and 199 from their normal relationship in Fig. 31 and force them to their buckled or collapsed relationship shown in Fig. 32. In the latter figure the bottom open end of the housing shell 171 has been depressed into solid abutment with the floor wall of the holding cup structure 174, spring 173 also yielding to permit this to occur.

As the work W rests upon and moves downwardly with the yielding housing shell, the staple legs which have been driven downwardly through the work and project therebelow into the mouth aperture 193 of the housing shell, become contacted by the pivotal anvil dies 194 whose free ends are prevented from descending by the stationary post 189 while their pivot pins 197 are carried downwardly with the housing shell. By the guiding aid of grooves 196 and the upward thrust of these dies, the legs of the staple are bent toward each other and then clinched against the under surface of the work with more force than can be exerted by spring 173 in merely squeezing the work or in the matter indicated in Fig. 32. As the top leg-clinching edges of dies 194 may be arranged to rise somewhat above the top mouth 192 of the housing shell, all of the force capable of being exerted on treadle 57 through the medium of the preloaded strong clevis spring 54 is enabled to be concentrated ultimately upon the staple legs to the exclusion of resistance by the work and in a manner to clinch them flatly against the under surface of the work and even if desired to embed them within the material of the work if the same be sufficiently soft.

The operator will now let up on treadle lever 57 and spring 65 will lift this treadle and the rod 51 and the right end of bell crank lever 46 which latter will swing counterclockwise about pivot 47 causing links 42 to rotate gear 41 clockwise. In the consequent upward movement of the stapling head, the force of springs 205, 204, 173 within the anvil housing shell 171 causes the anvil mouth 192 to elevate the work W and cause the magazine body sections 97, 98 to move upwardly in unison with the cylindrical casing 39 of the stapling head until foot disc 128 leaves contact with the work. At this point spring 163 is permitted to cause lengthwise separation of the plunger plate 161 relative to the top of the body sections 97, 98 which will cause telescopic movement between these body sections and the cylindrical casing 39 tending during the next portion of the return movement of the parts to keep the foot disc 128 still pressed downwardly against the work with only the pressure of spring 163 now active to this effect. This relative telescopic movement results in the staple driving blade 149 and its pusher spring 159 sliding upwardly in unison within the guideway 103 and in consequence of engagement between the shoulders 166 on the latter and the shoulders 156 on turning bar 148, this turning bar will be lifted simultaneously with its pusher 159 until the edges 166 of the latter are forced forwardly out of engagement with the turning bar shoulders 156 because of spring pusher 159 encountering the cam projection 169. Eventually as staple driving blade 149 continues its upward travel the bottom of its slot 167 will pick up and impel upwardly the stud 158 on the turning bar so that the latter is restored to its position shown in Fig. 6. In this position further upward movement of the turning bar is positively prevented by the engagement of its crotch 235 with the bottom edge 236 of the tripping cam 169. This movement limiting edge of cam 169 projects from the partition strip 104 abruptly and far enough to equal the thickness of the turning bar extensions 153 at their extreme top ends. In Fig. 6 the pusher 159 is seen to have sprung toward the right upon arriving above the turning bar and is positioned upon a subsequent downward stroke to again impel the turning bar downwardly.

As the staple driving blade 149 and turning bar 148 rise in unison from their positions shown in Fig. 24, the staple transfer block 127 is forced toward the left by its spring 132 carrying with it the staple which has last been received upon its top portion as heretofore described. At the time the stop notch 141 rides into its movement limiting engagement with the stop lug 134, the crown of the staple will be squeezed against this stop lug and straightened in a manner to cause the legs of the staple to spread into parallel relationship with each other. This is all accomplished by the power solely of spring 132 and transforms the staple from its broken line position and shape shown in Fig. 26 to its full line position and shape shown in said figure ready to be turned and driven upon a subsequent downward stroke of the staple driving bar and the staple turning bar as heretofore described.

After the parts of the stapling head itself have become restored to the relative positions shown in Figs. 6 and 7, a further upward movement of the stapling head as a whole takes place before links 42 contact with the pivot pin 32 in their upward swinging movement. This gives room between the stapling head 22 and the staple clinching device 23 to remove the work which has been stapled and to insert another piece of work while the parts of the entire machine remain in their normal positions shown in Fig. 1.

In the above described operation of parts certain relationships of the strength of springs employed are important and may be varied to suit different types of work. Preferably, the pre-loaded spring 54 will be able to overcome the resistance of spring 163, spring 132, spring 204, and spring 173 combined, and then serves as shock absorber at the extreme downward limit of movement of treadle 57. Also spring 204 alone, or spring 173 alone, or the combined action of these two springs should offer a resistance too great to be overcome by spring 163. In the action of spring 163 in spreading the parts of the stapling head telescopically to their relationship in Figs. 6 and 7, spring 163 is assisted by the spring 65 which is powerful enough to return all parts of the mechanism to their normal positions shown in Fig. 1.

Fig. 39 shows a stapling machine embodying the present improvements in which the work W² consists of a sheaf of book leaves resting on the angle plate 216 with the stapling head 22 and anvil clinching device of Figs. 30 to 33, inclusive, positioned rotatively on their common vertical axis to drive staples into the work and clinch the legs thereof while the crown of the staple is disposed in the direction aligning with the fold in the leaves of the book.

Figure 40:
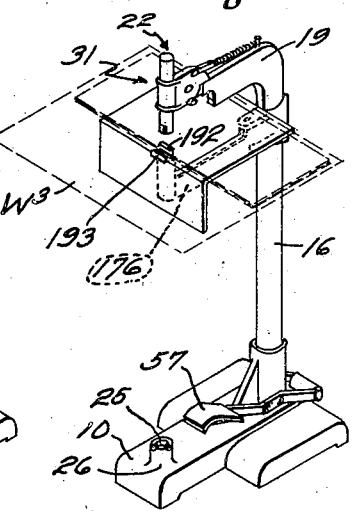

Fig. 40 shows the work rest 216 shifted to present its aperture 218 to the mouth 192 of the anvil housing 171 so that large flat sheets such as comprise a calendar may conveniently be supported and stapled with the crown of the stable parallel to the edge of the work W³.

Figure 41:
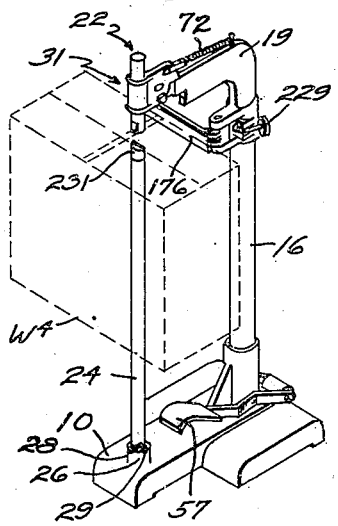

In Fig. 41 the clamp nut 229 has been loosened and draw bolt 230 swung out of engagement with the lugs 226 on the swinging bracket 176 so that the latter is swung aside to make room for the anvil post 24 and its anvil head 231 occupying, if desired, exactly the same position as the removed anvil shell 171. A piece of work comprising a deep box W⁴ is thus free to be supported between the stapling head 22 and the anvil head 231, the former swinging with its carrier 31 toward its position in Fig. 42 against the resistance of spring 72 to open up the space between the stapling head and the anvil for more easily accommodating the placement and removal of box W⁴ whose bottom overlapping flaps are to be stapled together. Staples may be driven into this box with their crowns disposed in either of two directions perpendicularly related, or in other words, with their crowns parallel to any edge or perpendicular to any edge of the flaps to be stapled despite the fact that the box is longer than twice the distance from the anvil post 24 to the machine standard 16. This is accomplished by lifting post 24 in its socket 25 and shifting it a quarter turn so that its positioning stud 29 will rest in notch 28 instead of notch 27. At the same time of course the inner magazine body of the stapling head 22 will be correspondingly shifted a quarter turn in the same direction by moving its parts from their relationship shown in Fig. 11 to the relationship shown in Fig. 12. This may be done by grasping any projecting end part which is fixed to the magazine body sections 97, 98, depressing them slightly within the cylindrical housing 39 against the resistance of spring 121 to disengage the staple track flange 107 from the notch 95 and turn it into register with notch 96 in the end disc 91 of the cylindrical housing. Screw 119 will thus be swung away from abutment with shoulder 94 while the diametrically opposite screw 119 will be carried into engagement with shoulder 93 whereupon spring 121 automatically lifts the track flange 107 into rotative locking engagement with notch 96. When the parts are performing relative telescopic movement for driving a staple, as in Fig. 45, the track flange 107 slides freely through whichever one of the notches 95 or 96 it may occupy. Engagement of the crotch 235 of turning bar 148 with the shoulder 236 of stop cam 169 limits the extent to which spring 163 can separate the parts between which it is confined at such times as the foot disc 128 is not pressed against work in the stapling operation.

Fig. 42 shows the carrier 31 locked to the overarm 19 by the plug screw 77 in a position to operate the stapling head 22 in a horizontal path toward and away from the anvil plate 84 as shown in Fig. 5. Since the bracket 176 remains swung aside and the post 24 is removed, bags filled with merchandise may have their open tops held upwardly between the foot disc 128 and the anvil plate 84 of Fig. 5 as represented by the work W⁵ in Fig. 42 so that a staple may be driven through the top edges of the bag and clinched while there is plenty of room for the contents of the bag to be suspended or supported therebelow. Here also through the ability to shift the stapling head parts from their condition in Fig. 11 to their condition in Fig. 12 and through the further ability of anvil plate 84 to be positioned as in Fig. 5a or Fig. 5b, the crown of the driven staple in Fig. 42 may be disposed parallel with or perpendicular to the edges of the bag or other work W⁵ requiring horizontally driven staples.

Figure 43:
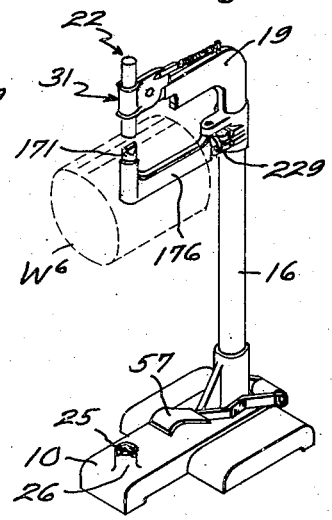

In Fig. 43 the apparatus is conditioned as in Fig. 38 except that the anvil shell 171 has been shifted a quarter turn so that its recess 186 instead of its recess 178 is engaged and rotatively locked by the plunger 177. Stapling head 22 is correspondingly conditioned so that the staples will be driven with their crowns aligned with the overarm 19 from front to back of the machine. This is important in stapling the seams of tubular work such as W⁶ which could not be placed on the anvil crosswise of the machine because of bracket 176 or post 24 which would intercept the work and make this impossible.

When the supply of staples is exhausted and the condition indicated by the absence of staple transfer block 127 from its aperture 130, the cap 114 is grasped and slightly depressed against the lifting tendency of spring 116 and turned counter clockwise in Fig. 9 until the register of openings 117 with the screw head 118 permit the rod 112 and the staple follower 109 to be withdrawn from the magazine chamber to permit the insertion of a new strip of staples, after which the follower and its cap handle 114 are restored in an obvious manner.

The ability of this novelly constituted apparatus to handle more diversified types of work than have heretofore been possible will be appreciated from the foregoing description. The advantages of the improvement may be availed of in forms which differ in construction and exact method of operation from that herein described to illustrate the invention. As an example, spring anvil device of Figs. 29 to 33 may be correspondingly supported on the frame of the overarm in place of anvil plate 84 or upon the top of post 24 in place of the anvil head 231. The appended claims are intended to cover all equivalents for the parts, mechanisms, and modes of operation disclosed herein which fairly come within their terms.

We claim:

1. A staple inserting machine including in combination with its support frame, a carrier mounted on said frame in a manner to be shiftable to different positions relative thereto, and a staple storing and driving unit supported and guided by said carrier in a manner to be movable relative to said carrier for feeding and driving staples thereby to be movable in respectively divers paths of travel relative to said frame in said different positions of said carrier.

2. A staple inserting machine including in combination with its support frame, a staple storing and driving unit comprised of relatively movable sections constructed and operatively supported upon said frame in such manner that the unit as a whole as well as one of said sections alone is movable relative to said frame in the operations of engaging the work and feeding and driving staples, another of said sections being constructed and arranged to be shiftable relative to the first said section in a manner to vary the direction in which the crown of the staple is disposed in relation to said frame.

3. A staple inserting machine including a combination with its support frame, a carrier mounted on said frame in a manner to be shiftable to different positions relative thereto, and a staple storing and driving unit comprised of relatively movable sections constructed and operatively supported upon said carrier in such manner that the unit as a whole as well as one of said sections alone is movable relative to said carrier and in divers paths of travel relative to said frame in said different positions of said carrier, one section of said unit being constructed and arranged to be shiftable relative to another section thereof in a manner to vary the direction in which the crown of the staple is disposed in relation both to said carrier and to said frame.

4. A staple inserting machine as defined in claim 1 together with power transmitting mechanism including ultimate actuating means arranged cooperatively between the said machine frame and the said staple storing and driving unit in a manner to motivate said unit with a like staple driving effect in each of the said divers paths of travel of said unit.

5. A staple inserting machine as defined in claim 2 together with power transmitting mechanism including ultimate actuating means arranged cooperatively between the said machine frame and the said staple storing and driving unit in a manner to motivate one of the said sections of said unit with a like staple driving effect when the said crown of the staple is disposed in either of unlike directions in relation to said frame.

6. A staple inserting machine as defined in claim 3 together with power transmitting mechanism including ultimate actuating means arranged cooperatively between the said machine frame and the said staple storing and driving unit in a manner to motivate said unit with like staple driving effect in either of the said divers paths of travel of said unit and also in a manner to motivate one of the said sections of said unit with a like staple driving effect when the said crown of the staple is disposed in either of unlike directions in relation to said frame.

7. A staple inserting machine as defined in claim 1 together with a staple clinching device constructed and arranged to be supported and located on the said frame in each of the said divers paths of travel of the said staple storing and driving unit.

8. A staple inserting machine as defined in claim 2 together with a staple clinching device having one or more die grooves for guiding the legs of staples while the latter are being clinched against the work, said device being constructed and arranged to be so supported on the said frame that said die groove or grooves can be aligned with either of unlike directions in which the crown of the staple may be disposed.

9. A staple inserting machine as defined in claim 1 together with power transmitting mechanism including a rack carried by the said staple storing and driving unit, and a gear rotatably supported by the said frame in operative engagement with said rack.

10. A staple inserting machine as defined in claim 1 together with a pivot on the said frame upon which the said carrier is mounted for swinging movement to its said different positions, and power transmitting mechanism including a rack carried by the said staple storing and driving unit and a gear rotatably supported by said frame in coaxial relation to said pivot and in operative engagement with said rack.

11. A staple inserting machine as defined in claim 2 together with a staple clinching anvil having a die groove for guiding the staple leg while the latter is being clinched against the work, said anvil being mounted on the said frame in a manner to be adjustably turned about an axis perpendicular to the crown of the driven staple thereby to align said anvil groove with either of unlike directions in which the crown of the staple may be disposed.

12. A staple inserting machine as defined in claim 1 in which the said support frame of the machine comprises a C-shaped structure on the upper end of which the said carrier is mounted in a manner to dispose the said staple storing and driving unit for movement either in a horizontal or a vertical path of travel, together with a staple clinching device mounted on each of the upper and lower ends of said C-shaped structure in positions to be presented to the staple driving end of the said staple storing and driving unit when the latter is moved for driving a staple either in a horizontal or vertical path of travel.

13. Stapling apparatus of the character described including in combination, a floor base, a frame standard rising therefrom, an overarm supported by said standard, a stapling head operatively mounted on said overarm, an anvil device including a supporting bracket, means pivotally to mount said bracket on said standard in a manner to be swingable about a vertical axis into and out of a temporary position such that said anvil underlies said stapling head, and an anvil supporting post constructed and arranged to be removably mounted on said base in such position that its anvil underlies said stapling head when said bracket is swung away from its said temporary position.

14. Stapling apparatus of the character described including a staple feeding and driving unit, embodying in combination an elongated cylindrical casing, an elongated magazine structure mounted within said casing in a manner to perform both rotative and telescopic sliding movement relative to the latter, and means cooperative with said casing and said structure constructed and arranged to be actuatable by movement of either relative to the other thereby to transfer a staple crosswise said magazine structure crown foremost in the direction in which the staple is moved.

15. Stapling apparatus as defined in claim 14 in which the said means to transfer a staple includes a staple supporting member slidably guided in a portion of the said magazine structure which projects lengthwise beyond one end of the said cylindrical casing and in which said magazine structure contains a lateral aperture in the path of movement of said staple supporting member adapted to admit the latter thereinto.

16. Stapling apparatus of the character described including a staple feeding and driving unit embodying in combination, an elongated cylindrical casing having an apertured cross wall at one end, an elongated magazine structure mounted within said casing in a manner to perform both rotative and telescopic sliding movement relative to the latter, and longitudinally projecting members rigid with one end of said structure and extending through an aperture in said cross wall thereby to be accessible outside of said casing.

17. Stapling apparatus of the character described including a staple feeding and driving unit embodying in combination, an elongated cylindrical casing having an apertured cross wall at one end, an elongated magazine structure mounted within said casing in a manner to perform both rotative and telescopic sliding movement relative to the latter, longitudinally projecting members rigid with one end of said structure and extending through an aperture in said cross wall thereby to be accessible outside of said casing, and resilient means interposed between said cross wall and the outer ends of said members in a manner to urge said magazine structure toward said cross wall lengthwise of said casing.

18. Stapling apparatus as defined in claim 17 in which the said resilient means comprises a bowed ring-like leaf type of spring.

19. Stapling apparatus of the character described including a staple feeding and driving unit embodying in combination, an elongated cylindrical casing and an elongated magazine structure mounted within said casing comprising matched body sections secured rigidly together and each containing channels sunk in the respectively opposed faces thereof which register to form a magazine chamber for storing staples.

20. Stapling apparatus of the character described including a staple feeding and driving unit embodying in combination, an elongated cylindrical casing, an elongated magazine structure mounted within said casing comprising matched body sections secured rigidly together each containing channels in the respectively opposed faces thereof which register to form a chamber, a staple actuating member, and a partition dividing said chamber into an elongated compartment for storing staples and a guideway for said staple actuating member.

21. The combination with stapling apparatus as defined in claim 19, of a guide track for staples having a projecting flange rigidly mounted in a groove extending lengthwise of one or more of the said body sections.

22. Stapling apparatus of the character described including a staple feeding and driving unit embodying in combination, an elongated cylindrical casing, an elongated magazine structure mounted within said casing comprising matched body sections, and longitudinally spaced hoops tightly encompassing said body sections to hold them together, said hoops slidably engaging the interior surface of said cylindrical casing to serve as bearing surfaces for said structure.

23. Stapling apparatus of the character described including a staple feeding and driving unit embodying in combination with a movable staple transfer member, an elongated magazine structure including matched body sections secured rigidly together, the adjoining faces of each of said body sections being hollowed out in a manner to form a magazine chamber for storing staples, and walls adjoining one end of said structure disposed in a manner to form a transversely extending guideway for said staple transfer member at the end of said structure.

24. The combination with stapling apparatus as defined in claim 23, of a foot plate rigidly secured to the said walls in a manner to complete a housing for the said staple transfer member, said plate containing an aperture positioned to permit the ejection therethrough of a staple which has been transferred by said member.

25. Stapling apparatus of the character described including a staple feeding and driving unit embodying in combination an elongated cylindrical casing having a cross wall at one end, a magazine structure telescopically slidable within said casing and projecting from the opposite end thereof, a staple driver reciprocative lengthwise of said magazine structure, a plunger plate between said magazine structure and said cross wall attached to said driver, and a driver retracting spring held under compression between said plunger plate and said magazine structure within said cylindrical casing.

26. Stapling apparatus of the character described including a staple feeding and driving unit embodying in combination, an elongated cylindrical casing having an apertured cross wall at one end, an elongated magazine structure within said casing defining a longitudinal chamber for storing staples, projecting members rigid with one end of said structure positioned eccentrically thereof and extending through an aperture in said cross wall to points outside of said casing, and a staple feeding device occupying said chamber including a cap-like member engageable with said projecting members outside of said casing.

27. Stapling apparatus of the character described including a staple feeding and driving unit, embodying in combination, a frame carried trip member, a channeled slide bar having a reduced thickness in its upper end portion and bifurcated thereat to permit the projection therethrough of said trip member, a staple driving blade mounted to be longitudinally slidable in the channel of said bar, and a leaf spring mounted at one end to move in unison with said staple driving blade, the other end of said spring being shaped and positioned to engage the portion of said slide bar having a reduced thickness in a manner to impel said slide bar to longitudinal movements in both directions and in a manner also to engage said trip member during said longitudinal movement.

28. The combination with stapling apparatus as defined in claim 27 of means cooperative between the said staple driving blade and the said slide bar constructed and arranged to permit and at all times positively to limit the extent of relative movement in both directions therebetween.

29. Stapling apparatus of the character described including in combination with a guide track for supporting a strip of staples, a staple transfer member reciprocative across the end of said track to receive and pick-off staples one at a time from said strip, a follower device resiliently urged along said guide track toward said transfer member, and a shoulder on said transfer member positioned to admit a portion of said follower device thereinto for obstructing reciprocative movement of said means when all staples of said strip have been removed from said guide track.

30. Stapling apparatus of the character described including in combination with spaced means forming a guideway for each leg of the staple, a staple driver constructed and arranged to exert a thrust upon the crown of the staple in a direction to force said staple legs end foremost along said guideway, and a resiliently positioned support member having a face occupying the path of travel of the staple crown and inclined relative to said guideways thereby yieldingly to support the crown of the staple against distortion as the thrust of said driver causes the staple to enter the work, and an elongated magazine for storing staples terminating at an end disposed to feed staples one by one to said support member, the latter being constructed and moveable crosswise of said magazine end and toward said guideway in a manner to transfer a staple from said magazine end to said guideway.

31. Stapling apparatus of the character described including in combination, an anvil device including a work rest, a first spring supporting said work rest, a stapling head device including parts telescopically collapsible in a path of movement aligned with said work rest, a second spring tending to extend said parts telescopically in said path of movement, actuating connections to force said stapling head device toward said anvil device, and a third spring arranged to transmit power through said actuating connections to said stapling head device, said springs being so cooperatively related that the power of said third spring can overcome the resistance of said first spring while the resistance of said first spring can overcome the power of said second spring.

32. Stapling apparatus of the character described including in combination, a moveable work support, a device constructed and arranged to resist movement of said support responsive to pressure of work thereagainst with substantially constant resilient strength, another device constructed and arranged to resist said movement of said support with automatically and abruptly changing resilient strength, a staple clinching die in movable relation to said support, and a non-yielding abutment arranged firmly to support a part of said die which is movable in relation to said work support.

33. Stapling apparatus as defined in claim 32 in which one of said devices includes resiliently biased rigid toggle levers constructed and arranged to contribute to the support of the said work support.

34. Stapling apparatus of the character described including in combination, a yieldable work support, a staple clinching die in moveable relation to said support, and a non-yielding abutment arranged firmly to support a part of said die which is moveable in relation to said work support, pivotally connected toggle links constructed and arranged to be caused to buckle away from dead center relationship by the yielding of the said work support, a spring urging said links toward said dead center relationship, and means to prevent said links from attaining said dead center relationship.

35. Stapling apparatus of the character described including a yieldably mounted housing for supporting work to be stapled said housing containing an aperture, a non-yielding staple clinching die stationed within said housing in a manner to receive the thrust of staple legs forced inwardly through said aperture, a resiliently conditioned toggle mechanism including pivotally connected links constructed and arranged to resist the yielding of said housing, and an adjustable device operative to determine the degree of proximity to dead center into which said links are capable of being moved.

36. In a staple driving machine, an elongated housing, means defining a raceway extending longitudinally of said housing, a staple guide extending longitudinally of the housing, means for feeding a strip of staples having bent crowns along said guide with the legs of the staples transverse the housing, means operable both to transfer the forward staple of the strip to the raceway and to straighten the crown of said staple, means to engage the legs of this staple in a manner to position said legs longitudinally of the raceway, and means thereafter to drive the transferred and straightened staple through the raceway.

37. The combination with stapling apparatus as defined in claim 31 of means to adjust the effective strength of the said first spring in relation to the effective strength of the said third spring thereby to cause the apparatus to vary the character of clinching effect produced by the said anvil device upon the staples.

38. In a staple driving machine, an elongated housing, a staple guide extending longitudinally of the housing, means for feeding staples along the guide with the legs of the staples extending transversely of the housing, a raceway extending longitudinally of the housing, a block slidable transversely of the raceway, a spring operable to slide said block in a manner to separate the forward staple from the guide and transfer that staple to dispose its crown in the raceway, means thereafter movable crosswise the path of said block to shift the staple to bring its legs within and extending longitudinally of the raceway, and means then movable into the path of said block to drive the staple through the raceway, together with means to hold the said means to drive the staple normally out of the path of said block.

39. Staple driving apparatus of the character described including in combination, elongated housing sections normally extended from each other in straight longitudinal alignment thereby jointly to form a magazine chamber for storing staples having bent crowns, said sections slidably engaging with each other in a manner telescopically to collapse, and mechanism contained within said chamber for actuating said staples and including parts respectively connected to said housing sections to be cooperatively moved by telescopic collapsing thereof in a manner automatically to straighten the crowns of said staples and drive them one by one with straightened crowns to the exterior of said housing sections.

40. Stapling apparatus of the character described including in combination, a power applying gear, a carrier adjustably swingable about the axis of said gear, a stapling head including a rack adapted to mesh with said gear mounted on said carrier for sliding movement in a direction tangent to the periphery of said gear, and retractable means to limit the adjustment of said carrier to a range of swinging movement in which said rack and gear remain in mesh, the arrangement being such that retraction of said stop permits sufficient additional swinging movement of said carrier to run said rack out of mesh with said gear.

ROY E. PETERSON.
HOWARD M. LARSEN.